(12) United States Patent
Meyer et al.

(10) Patent No.: US 11,156,104 B2
(45) Date of Patent: Oct. 26, 2021

(54) SYSTEMS AND METHODS FOR BONDING OF DISSIMILAR SUBSTRATES

(71) Applicant: United Technologies Corporation, Farmington, CT (US)

(72) Inventors: Jesse C. Meyer, Colchester, CT (US); Joseph Jalowka, Broad Brook, CT (US); John D. Riehl, Hebron, CT (US); Raymond P. Martina, Manchester, CT (US); James O. Hansen, Glastonbury, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 134 days.

(21) Appl. No.: 16/255,976

(22) Filed: Jan. 24, 2019

(65) Prior Publication Data

US 2019/0153878 A1 May 23, 2019

Related U.S. Application Data

(62) Division of application No. 14/992,672, filed on Jan. 11, 2016, now Pat. No. 10,221,700.

(51) Int. Cl.
*F01D 5/28* (2006.01)
*C09J 5/02* (2006.01)
(Continued)

(52) U.S. Cl.
CPC ............ *F01D 5/282* (2013.01); *B32B 15/043* (2013.01); *C09J 5/02* (2013.01); *C09J 5/04* (2013.01);
(Continued)

(58) Field of Classification Search
CPC ......... C09J 5/06; C09J 5/04; C09J 5/02; C09J 2201/36; C09J 2463/00; B32B 15/043;
(Continued)

(56) References Cited

U.S. PATENT DOCUMENTS

| 2013/0220536 A1* | 8/2013 | Parkin | F04D 29/324 156/285 |
| 2014/0069077 A1* | 3/2014 | Murdock | F04D 29/324 60/39.091 |
| 2017/0023010 A1* | 1/2017 | Drozdenko | B32B 7/12 |

FOREIGN PATENT DOCUMENTS

| EP | 2634367 | 9/2013 |
| WO | 2015047756 | 4/2015 |
| WO | 2015099937 | 7/2015 |

OTHER PUBLICATIONS

Extended European Search Report dated Jun. 9, 2017 in European Application No. 17150561.3.
(Continued)

*Primary Examiner* — Moshe Wilensky
(74) *Attorney, Agent, or Firm* — Snell & Wilmer L.L.P.

(57) ABSTRACT

The present disclosure provides methods and systems for the bonding of dissimilar substrates. For example, a first substrate may be coupled to a second substrate by a composite joint between the first substrate and the second substrate. The composite joint may be comprised of a first adhesive material and a second adhesive material. The first adhesive material may be disposed on the first substrate, and the second adhesive material may be disposed to the first adhesive material. The composite joint between the first substrate and the second substrate may provide an isolation layer therebetween, preventing galvanic corrosion.

6 Claims, 4 Drawing Sheets

(51) Int. Cl.
    *C09J 5/04*         (2006.01)
    *C09J 5/06*         (2006.01)
    *B32B 15/04*       (2006.01)
    *C22C 21/00*       (2006.01)

(52) U.S. Cl.
    CPC ............. *C09J 5/06* (2013.01); *C22C 21/00* (2013.01); *B32B 2255/06* (2013.01); *B32B 2255/26* (2013.01); *B32B 2603/00* (2013.01); *C09J 2301/208* (2020.08); *C09J 2463/00* (2013.01); *F05D 2300/603* (2013.01)

(58) Field of Classification Search
    CPC ............ B32B 2603/00; B32B 2255/06; B32B 2255/26; C22C 21/00; F05D 2300/603; F01D 5/282
    See application file for complete search history.

(56) References Cited

OTHER PUBLICATIONS

USPTO; Restriction Requirement Office Action dated Nov. 17, 2017 in U.S. Appl. No. 14/992,672.
USPTO; Non-Final Office Action dated Feb. 22, 2018 in U.S. Appl. No. 14/992,672.
USPTO; Final Office Action dated Jul. 9, 2018 in U.S. Appl. No. 14/992,672.
USPTO; Advisory Action dated Sep. 20, 2018 in U.S. Appl. No. 14/992,672.
USPTO; Notice of Allowance dated Nov. 2, 2018 in U.S. Appl. No. 14/992,672.

\* cited by examiner

SYSTEMS AND METHODS FOR BONDING OF DISSIMILAR SUBSTRATES

CROSS REFERENCE TO RELATED APPLICATIONS

This application is a divisional of, and claims priority to and the benefit of, U.S. Ser. No. 14/992,672 filed Jan. 11, 2016 and entitled "SYSTEMS AND METHODS FOR BONDING OF DISSIMILAR SUBSTRATES," which is incorporated by reference herein in its entirety for all purposes.

FIELD OF THE DISCLOSURE

The present disclosure relates to the bonding of dissimilar substrates.

BACKGROUND OF THE DISCLOSURE

Dissimilar metals and metal alloys may have different electrode potentials. Therefore, where dissimilar metals and/or metal alloys come into contact with one another in the presence of an electrolyte, one metal or metal alloy may act as an anode and the other metal or metal alloy may act as a cathode, creating a galvanic electrochemical cell. This results in galvanic corrosion, in which one metal or metal alloy is preferentially corroded as a consequence of spontaneous oxidation-reduction chemical reactions occurring between the metals and/or metal alloys. The addition of an adhesive material in the bonding of dissimilar metals or metal alloys may not prevent galvanic corrosion by forming an isolation layer because adhesives may have rheological properties.

SUMMARY OF THE DISCLOSURE

In various embodiments, the present disclosure provides methods and systems for the bonding of dissimilar substrates.

In various embodiments, a method for bonding dissimilar substrates may comprise disposing a first adhesive material onto the first substrate contact surface of a first substrate, the first substrate comprising an aluminum alloy, curing the first adhesive material to form a cured first adhesive material, disposing a second adhesive material onto a first adhesive side of the cured first adhesive material, and disposing a second substrate contact surface of a second substrate onto the second adhesive material, the second substrate comprising a titanium alloy. The method for bonding dissimilar substrates may further comprise curing the second adhesive material, and curing the first adhesive material and curing the second adhesive material may take place at different times. Curing the first adhesive may comprise the application of a vacuum bag assembly on the first adhesive side. In various embodiments, the method for bonding dissimilar substrates may comprise preparing a first adhesive side. The first substrate may be an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, and 0.05 percent zinc, or the first substrate may be an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum. The second substrate may be a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium. The first adhesive and the second adhesive may be supported epoxy film adhesives, and they may be comprised of the same material.

In various embodiments, a system of dissimilar bonded substrates may comprise a first substrate comprising an aluminum alloy and having a first substrate contact surface, a composite joint comprising a first adhesive material coupled to the first substrate contact surface, the first adhesive material comprising a first adhesive side, and a second adhesive material coupled to the first adhesive side, and a second substrate comprising a titanium alloy coupled to the second adhesive material, wherein composite joint may electrically isolate the second substrate from the first substrate. The first adhesive material may have been cured by vacuum bagging and the first adhesive side may be textured. The first adhesive material and the second adhesive material may be comprised of the same material. The first substrate may be an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, and 0.05 percent zinc, or the first substrate may be an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum. The second substrate may be a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

In various embodiments, a blade of a gas turbine engine may comprise a blade body comprised of an aluminum alloy and may have a body contact surface, a blade edge comprised of a titanium alloy which may have an edge contact surface, and a composite joint disposed between the blade body and the blade edge, the composite joint comprising a first adhesive material coupled to the body contact surface, the first adhesive material comprising a first adhesive side, and a second adhesive material coupled to the edge contact surface and the first adhesive side. The composite joint may electrically isolate the blade body from the blade edge. The first adhesive material may have been cured by vacuum bagging and the first adhesive side may be textured. The first adhesive material and the second adhesive material may be supported epoxy film adhesives, and they may be the same material. The blade body may be an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, and 0.05 percent zinc, or the blade body may be an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum. The blade edge may be a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

BRIEF DESCRIPTION OF THE DRAWINGS

The accompanying drawings are included to provide a further understanding of the present disclosure and are incorporated in, and constitute a part of, this specification, illustrate various embodiments, and together with the description, serve to explain the principles of the disclosure.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical, chemical, electrical, and mechanical changes may be made without departing from the spirit and scope of the disclosure. Thus, the detailed description herein is presented for purposes of illustration only and not of limitation.

For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

For example, in the context of the present disclosure, methods, systems, and articles may find particular use in connection with gas turbine engines. However, various aspects of the disclosed embodiments may be adapted for optimized performance in a variety of engines or other applications. As such, numerous applications of the present disclosure may be realized.

Figure 1:
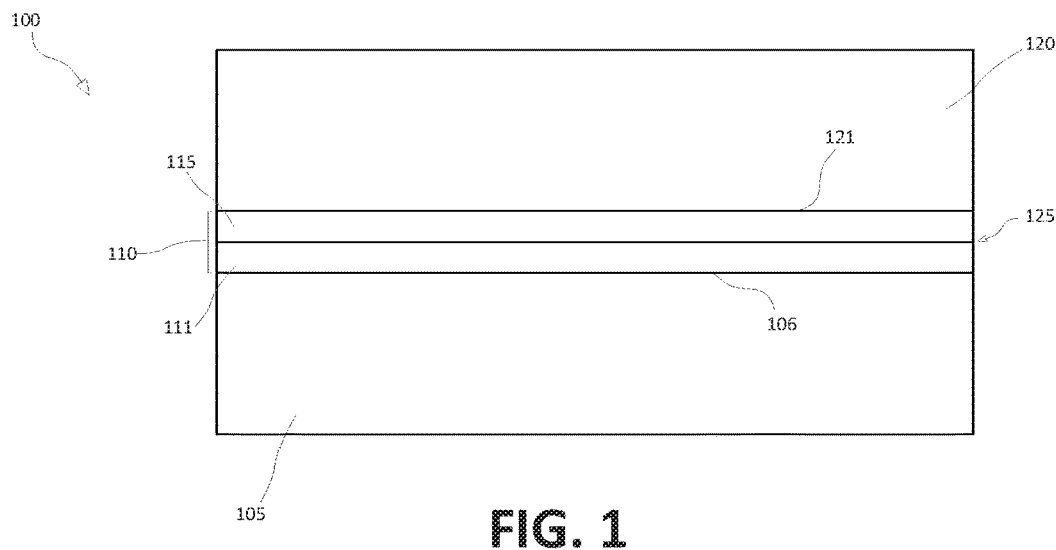
FIG. 1 illustrates a system of dissimilar bonded substrates in accordance with various embodiments.

Referring to FIG. 1, in accordance with various embodiments, a system of dissimilar bonded substrates 100 is depicted comprising a first substrate 105, a composite joint 110, and a second substrate 120. The first substrate 105 may comprise a metal, metal alloy, or any other suitable material. The first substrate 105 may be an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc, wherein such aluminum alloy is commonly known by the industry standard designation of Aluminum 1060, described, among other places, by ASTM International Standard B210, and hereinafter referred to as "Aluminum 1060". In various embodiments, the first substrate 105 may be an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum, commonly known by the industry standard designation of Aluminum 7055 and hereinafter referred to as "Aluminum 7055." In various embodiments, the first substrate 105 may comprise a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium, commonly known by the industry standard designation of Titanium 6Al-4V, and hereinafter referred to as "Titanium 6Al-4V." The first substrate 105 may comprise any other metal or metal alloy. A first substrate contact surface 106 of the first substrate 105 may be treated in preparation for bonding or coupling with the composite joint 110 by a suitable surface treatment for the particular substrate being used. As an illustrative example, aluminum and aluminum alloys may be anodized with phosphoric acid in preparation for bonding. A corrosion-resistant primer may be applied to the first substrate contact surface 106 that has been treated.

The composite joint 110 may be coupled to the first substrate 105 and may comprise at least one nonmetallic material. The composite joint 110 may be configured to bond two dissimilar substrates or materials, the first substrate 105 and the second substrate 120, and prevent galvanic corrosion from occurring between the first substrate 105 and the second substrate 120 by providing an isolation layer. As used herein, the term "isolating," "isolation," or the like, may refer to electrically insulating or electrical insulation, and/or completely or substantially blocking electrical conductivity and electrochemical communication between two or more materials and/or substrates. In various embodiments, the composite joint 110 may comprise a first adhesive material 111 and a second adhesive material 115. The first adhesive material 111 may be coupled to the first substrate 105. The first adhesive material 111 may comprise, for example, one or more epoxies, bismaleimides, cyanate esters, or polyimides, and may be a supported or unsupported film and/or paste. A supported adhesive material may comprise a support comprised of nylon, polyester, fiberglass, or glass, which may be woven or non-woven. In various embodiments, the first adhesive material 111 may be coupled to the first substrate 105 and then cured by vacuum bagging using a vacuum bag assembly applied to first adhesive side 125. After curing, the first adhesive side 125 may be a textured and/or chemically compatible surface amenable to bonding or coupling to other materials.

In various embodiments, the second adhesive material 115 may be coupled to the first adhesive material 111 and the second substrate 120. The second adhesive material 115 may be, for example, a type of adhesive discussed in the description of the first adhesive material 111. In various embodiments, the first adhesive material 111 and the second adhesive material 115 may be supported epoxy film adhesives. In various embodiments, the second adhesive material 115 may be a different material than the first adhesive material 111. In various embodiments, the second adhesive material 115 may be the same material as the first adhesive material 111. In various embodiments, the second adhesive material 115 may be coupled to the second substrate 120 and cured by vacuum bagging using a vacuum bag assembly. In various embodiments, the first adhesive material 111 and the second adhesive material 115 may be cured at different times. The second adhesive material 115 may be applied to the first adhesive side 125 after the first adhesive material 111 has been cured. In various embodiments, the second adhesive material 115 may be coupled to the first adhesive material 111 in such a way that the first adhesive material 111 may completely or substantially separate the first substrate 105 from the second adhesive material 115. That is, the first adhesive material 111 may completely or substantially electrically isolate, and/or physically isolate, the first substrate 105 from the second adhesive material 115. The first adhesive material 111 and the second adhesive material 115 may be supported epoxy film adhesives.

In various embodiments, the second substrate 120 may be coupled to the second adhesive material 115. The second substrate 120 may comprise a metal, metal alloy, or any other suitable material. The second substrate 120 may be an aluminum alloy, for example, Aluminum 1060 or Aluminum 7055. In various embodiments, the second substrate 120 may comprise a titanium alloy, for example, Titanium 6Al-4V. In various embodiments, the second substrate 120 may be a different material than the first substrate 105. A second substrate contact surface 121 of the second substrate 120 may be treated in preparation for bonding by a proper surface treatment for the particular substrate being used. A corrosion-resistant primer may be applied to the second substrate contact surface 121 that has been treated. The second substrate contact surface 121 of the second substrate 120 may be disposed onto the second adhesive material 115 before the second adhesive material 115 has been cured. In various embodiments, the second substrate 120 may be coupled to the second adhesive material 115 in such a way that the second adhesive material may completely or substantially electrically isolate, and/or physically isolate, the second substrate 120 from the first adhesive material 111. The composite joint 110 may completely or substantially electrically isolate the first substrate 105 from the second substrate 120. Thus, the first substrate 105 and the second substrate 120 may not be in physical contact, or electrochemical communication, with one another and may be completely or substantially electrically isolated by the composite joint 110, which may provide for an isolation layer and prevent galvanic corrosion from occurring between the first substrate 105 and the second substrate 120.

In various embodiments, a composite joint bonding or coupling two substrates, which may be dissimilar, may comprise more than two adhesive materials. There may be as many adhesive materials as desired to form a composite joint between two dissimilar substrates, and at least two of the adhesive materials may be cured at different times. That is, a first adhesive material may be cured before a second adhesive material is disposed on the cured first adhesive material. The composite joint with two or more adhesive materials may be configured to function as an isolation layer between the two dissimilar substrates to electrically isolate the substrates and prevent galvanic corrosion from occurring between them.

In various embodiments, two substrates and a composite joint coupling them, comprising adhesive materials, may not be coupled to one another along a horizontal surface, or an axis, as depicted in FIG. 1. A first substrate and a second substrate may be coupled in any way, along any shape of surface, such that the first substrate and the second substrate may be completely or substantially separated and electrically isolated by a composite joint comprising at least two adhesive materials, and the first substrate and the second substrate may not be in electrochemical communication. In various embodiments, a first adhesive material comprised in the composite joint may completely or substantially electrically isolate, and/or physically isolate, the first substrate from a second adhesive material comprised in the composite joint, and the second adhesive material may completely or substantially electrically isolate the first adhesive material from the second substrate. The composite joint may serve as an isolation layer to prevent galvanic corrosion from occurring between the first substrate and the second substrate.

Figure 2:
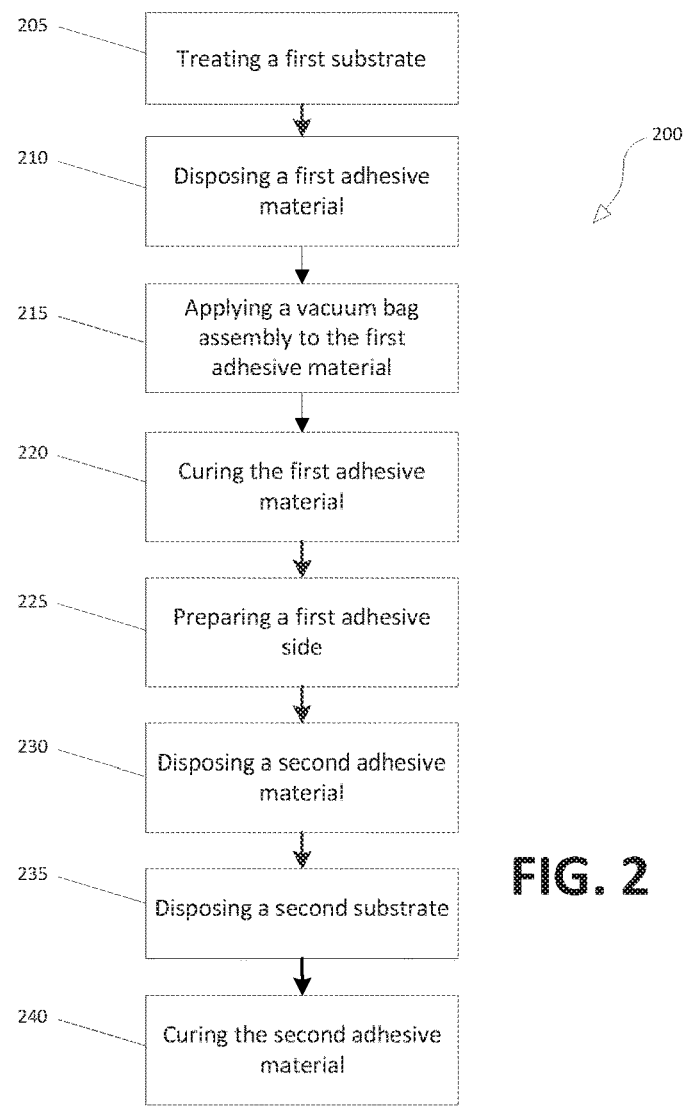
FIG. 2 illustrates a block diagram depicting a method for bonding dissimilar substrates.

FIG. 2 illustrates a block diagram depicting a method of bonding two dissimilar substrates 200, in accordance with various embodiments. With combined reference to FIG. 1, treating a first substrate 205 may comprise a first substrate 105 that is a metal, metal alloy or any other suitable material. The first substrate 105 may be an aluminum alloy, for example, Aluminum 1060 or Aluminum 7055. In various embodiments, the first substrate 105 may comprise a titanium alloy, for example, Titanium 6Al-4V. Treating the first substrate 205 may comprise preparing the first substrate contact surface 106 using any suitable surface treatment method in preparation of the bonding of the first substrate 105 to another material. As an illustrative example, aluminum and aluminum alloys may be anodized with phosphoric acid in preparation for bonding. A corrosion-resistant primer may be applied to the first substrate contact surface 106 that has been treated.

In various embodiments, disposing a first adhesive material 210 may comprise disposing the first adhesive material 111 on the first substrate contact surface 106 of the first substrate 105 using any suitable method. The first adhesive material 111 may comprise, for example, any material described herein in the description of the first adhesive material 111 for FIG. 1.

In various embodiments, applying a vacuum bag assembly to the first adhesive material 215 may comprise disposing a vacuum bag assembly to the first adhesive material 111 in preparation for curing the first adhesive material 111. The vacuum bag assembly may comprise a peel ply, a bleeder cloth, a release ply, a non-woven mat, and a nylon vacuum bag. The peel ply may be applied directly to the first adhesive side 125, and may be comprised of a fibrous and porous material such as a nylon cloth or a polyester film. The peel ply may be a dry peel ply, or a wet peel ply which may have a resin in the peel ply that is compatible with the first adhesive material 111, so the peel ply will not bond with the first adhesive material once the first adhesive material 111 is cured. In various embodiments, the bleeder cloth may be a fiberglass fabric and may be applied to the peel ply. The bleeder cloth may absorb any excess of the first adhesive material 111 that bleeds through the peel ply during the curing process. The bleeder cloth thickness may be determined by the anticipated amount of first adhesive material 111 that will be excess material and bleed through the peel ply. The release ply may be applied to the bleeder cloth, which may be a coated Teflon fiberglass configured to avoid bonding to any other materials. The non-woven mat may be applied to the release ply, which may be a breather material configured to distribute and enable uniform vacuum pressure under the nylon vacuum bag. Finally, the nylon vacuum bag may be applied to the non-woven mat.

In various embodiments, curing the first adhesive material 220 may comprise applying vacuum pressure within the nylon vacuum bag to cure the first adhesive material 111 with a combination of pressure and heat, producing a cured first adhesive material. In various embodiments, the vacuum bag assembly may be removed after the first adhesive material 111 is cured. The peel ply may be removed last from the first adhesive material 111. The first adhesive side 125 may be a textured or chemically compatible surface amenable to bonding or coupling to other materials. The first adhesive material 111 being cured by any suitable method. Preparing a first adhesive side 225 may comprise preparing and cleaning the first adhesive side 125 using any suitable method, including solvent wiping, abrasion, or plasma activation.

In various embodiments, disposing a second adhesive material 230 may comprise disposing the second adhesive material 115 onto the first adhesive side 125 of the cured first adhesive material by any suitable method. The second adhesive material 115 may be, for example, a type of adhesive material discussed in the description of the first adhesive material 111 for FIG. 1. In various embodiments, the first adhesive material 111 and the second adhesive material 115 may be supported epoxy film adhesives. In various embodiments, the second adhesive material 115 may be comprised of the same material as the first adhesive material 111. In various embodiments, the second adhesive material 115 may be comprised of a different material than the first adhesive material 111.

In various embodiments, disposing a second substrate 235 may comprise treating a second substrate contact surface 121 of the second substrate 120 by a proper surface treatment for the particular substrate being used in preparation for bonding to another material. The second substrate 120 may be an aluminum alloy, for example Aluminum 1060 or Aluminum 7055. In various embodiments, the second substrate 120 may comprise a titanium alloy, for example, Titanium 6Al-4V. In various embodiments, the second substrate 120 may be a different material than the first substrate 105. A corrosion-resistant primer may be applied to the second substrate contact surface 121 that has been treated. Disposing a second substrate 235 may further comprise disposing the second substrate contact surface 121 of the second substrate 120 onto the second adhesive material 115. In various embodiments, curing the second adhesive 240 may comprise the second adhesive material 115 being cured by any suitable method, for example, by vacuum bagging using a vacuum bag assembly applied to the second adhesive material 115, as described herein for curing the first adhesive material 111. Together, the first adhesive material 111 and the second adhesive material 115 may form a composite joint 110 which may electrically isolate the first substrate 105 from the second substrate 120, and may prevent galvanic corrosion from occurring between the first substrate 105 and the second substrate 120. The first adhesive material 111 may completely or substantially electrically isolate, and/or physically isolate, the first substrate 105 from the second adhesive material 115, and the second adhesive material 115 may completely or substantially electrically isolate, and/or physically isolate, the first adhesive material 111 from the second substrate 120.

In various embodiments of the systems and methods for bonding two dissimilar substrates, there may be more than two adhesive materials in a composite joint between a first substrate and a second substrate. The composite joint may completely or substantially electrically isolate the first substrate from the second substrate and may be configured to prevent galvanic corrosion from occurring between them. There may be any number of adhesive materials in a composite joint between two substrates, and at least two of the adhesive materials in the composite joint may be cured at different times. That is, a first adhesive material may be cured, producing a cured first adhesive material, before a second of the at least two adhesive materials is disposed on the cured first adhesive material.

Figure 3:
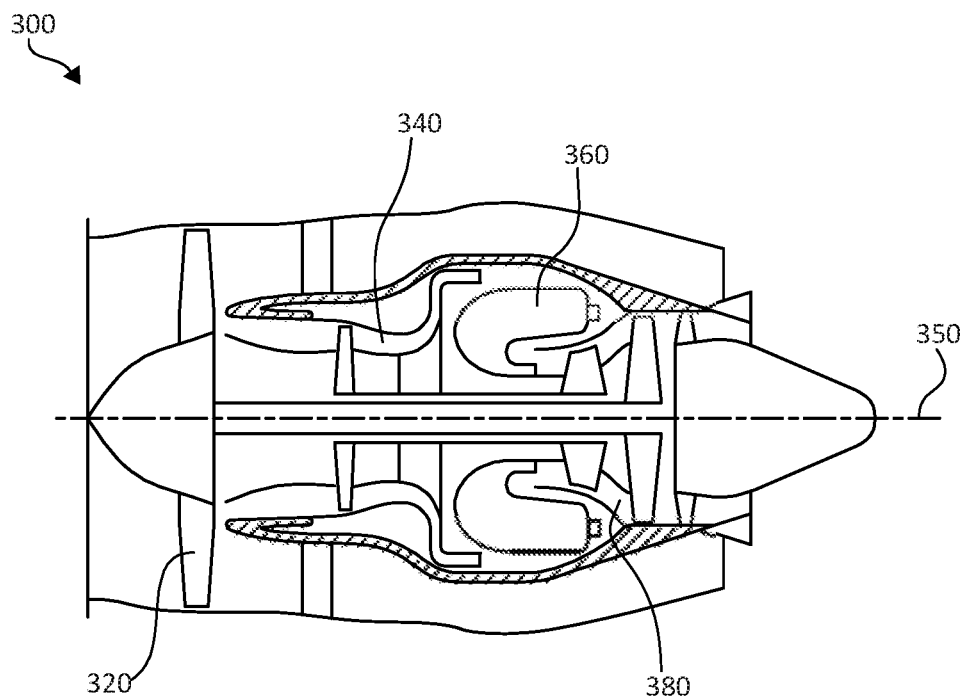
FIG. 3 illustrates a cross-sectional view of a gas turbine engine in accordance with various embodiments.

In various embodiments, this disclosure may be applied to a gas turbine engine in an aircraft, and specifically, in a fan blade, or other rotor blade, of a gas turbine engine. Referring to FIG. 3, a gas turbine engine 300 is illustrated according to various embodiments. The gas turbine engine 300 may generally comprise, in serial flow communication, a fan 320 through which ambient air is propelled, a compressor section 340 for pressurizing the air, a combustor 360 in which the compressed air is mixed with fuel and ignited for generating an annular stream of hot combustion gases, and a turbine section 380 for extracting energy from the combustion gases. Axis of rotation 350 may define the forward-aft position of the gas turbine engine 300. For example, the fan 320 may be referred to as forward of the turbine section 380 and the turbine section 380 may be referred to as aft of the fan 320. As air flows from the fan 320 to the more aft components of the gas turbine engine 300, the axis of rotation 350 may also generally define the direction of the air stream flow.

Figure 4:
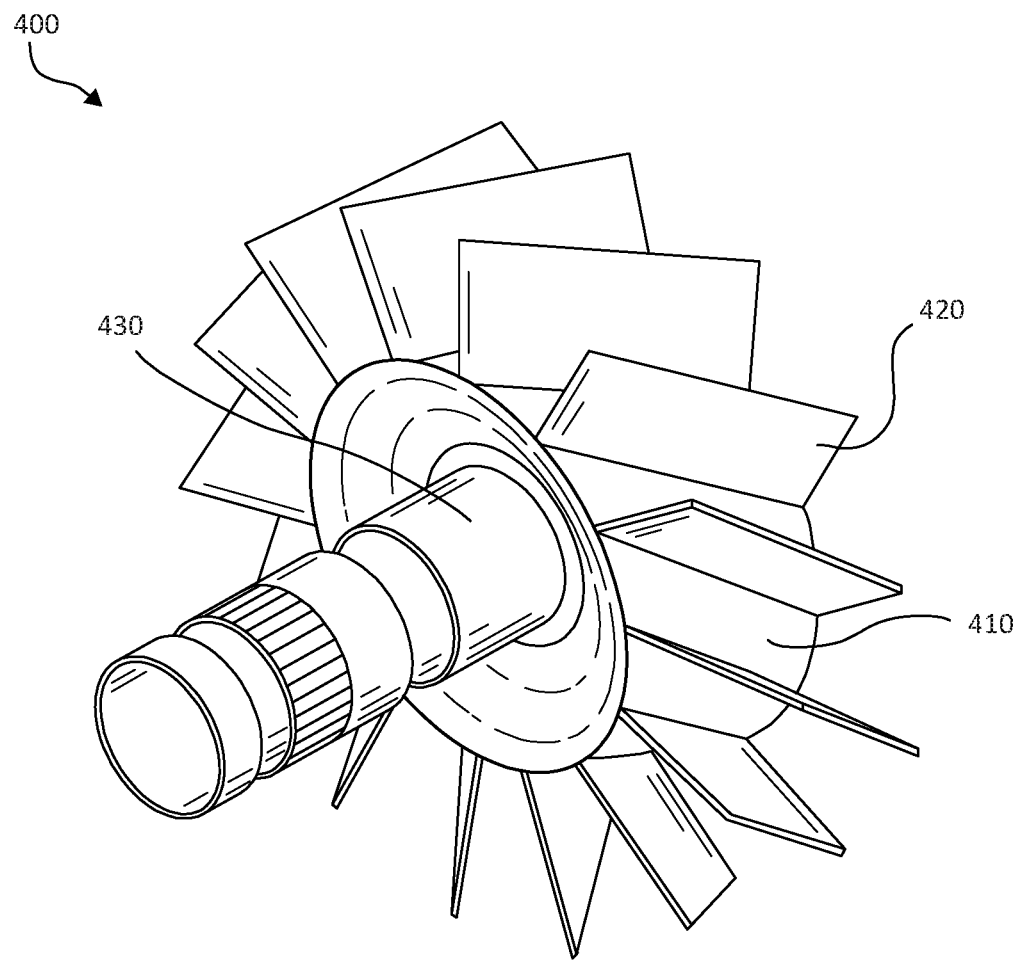
FIG. 4 illustrates a perspective view of a rotor which may be used in a gas turbine engine in accordance with various embodiments.

Referring to FIGS. 3 and 4, in accordance with various embodiments, a rotor 400 which may be used in the gas turbine engine 300 of FIG. 3, or in any other adequate type of gas turbine engine, is illustrated. In the illustrated embodiment, the rotor 400 is a first stage of a high pressure compressor of the compressor section 340. However, it is understood that the rotor can be any other rotor of the gas turbine engine 300, including a turbine rotor. The rotor 400 may comprise a rotor disk 410 which supports a circumferential array of regularly spaced blades 420. The rotor disk 410 and the blades 420 may be, but are not necessarily integrally molded. The rotor disk 410 may include a hub 430 for engaging a central shaft.

Figure 5:
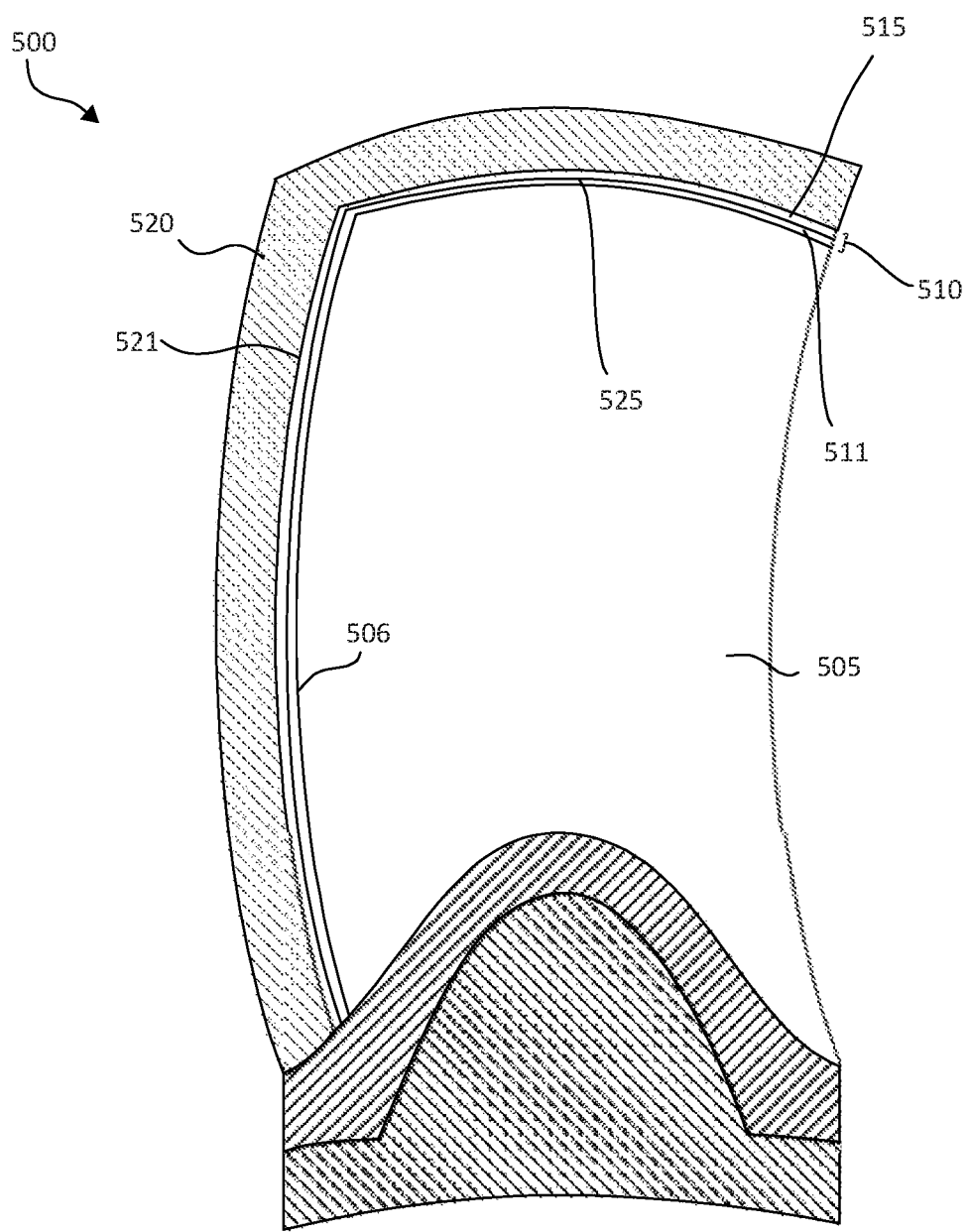
FIG. 5 illustrates a cross sectional view of a fan blade in accordance with various embodiments.

Referring to FIG. 5, in accordance with various embodiments, a cross-section of a fan blade 500 is depicted. Although a fan blade 500 is depicted for illustrative purposes, it should be understood that any rotor blade may incorporate this disclosure, including turbine and/or compressor rotor blades. The fan blade 500 may comprise a fan blade body 505, a fan blade edge 520, and a composite joint 510 between the fan blade body 505 and the fan blade edge 520. The fan blade body 505 may comprise a body contact surface 506, may serve as a first substrate, and may be comprised of a metal, metal alloy, or any other suitable material including a composite material. For example, the fan blade body 505 may be comprised of an aluminum alloy, for example, Aluminum 1060 or Aluminum 7055.

In various embodiments, the composite joint 510 between the fan blade body 505 and the fan blade edge 520 may be comprised of at least one nonmetallic material, and may be configured to bond two dissimilar materials and prevent galvanic corrosion from occurring between the fan blade body 505 and the fan blade edge 520 by providing an isolation layer. In various embodiments, the composite joint 510 may comprise a first adhesive material 511 and a second adhesive material 515. The first adhesive material 511 may be coupled to the body contact surface 506 of the fan blade body 505. The first adhesive material 511 may be, for example, a type of adhesive material discussed in the description of the first adhesive material 111 for FIG. 1. The first adhesive material 511 may be applied to the body contact surface 506 by any suitable method. In various embodiments, the first adhesive material 511 may be cured by vacuum bagging using a vacuum bag assembly. After the first adhesive material 511 has been cured by vacuum bagging, the first adhesive material 511 may comprise a first adhesive side 525 that is textured or chemically compatible, making it amenable to bonding or coupling to other materials.

In various embodiments, the second adhesive material 515 may be, for example, a type of adhesive material discussed in the description of the first adhesive material 111 for FIG. 1. In various embodiments, the first adhesive material 511 and the second adhesive material 515 may be supported epoxy film adhesives. In various embodiments, the second adhesive material 515 may be a different material than the first adhesive material 511. In various embodiments, the second adhesive material 515 may be the same material as the first adhesive material 511. The second adhesive material 515 may be cured by vacuum bagging using a vacuum bag assembly applied to the second adhesive material 515. In various embodiments, the first adhesive material 511 and the second adhesive material 515 may be cured at different times, and the second adhesive material 515 may be applied to the first adhesive side 525 after the first adhesive material 511 has been cured. In various embodiments, the second adhesive material 515 is coupled to the first adhesive material 511 in such a way that the first adhesive material 511 may completely or substantially electrically isolate, and/or physically isolate, the second adhesive material 515 from the fan blade body 505. In various embodiments, the composite joint 510 may be comprised of adhesive materials in addition to the first adhesive material 511 and the second adhesive material 515.

In various embodiments, the fan blade edge 520 may serve as a second substrate, and may be coupled to the second adhesive material 515. The fan blade edge 520 may comprise a metal, metal alloy, or any other suitable material. For example, the fan blade edge 520 may be comprised of titanium alloy, for example, Titanium 6Al-4V. The fan blade body 505 and the fan blade edge 520 may be comprised of different materials that may, if in contact with one another, experience galvanic corrosion. An edge contact surface 521 of the fan blade edge 520 may be treated in preparation for bonding or coupling with the second adhesive material 515 by a proper surface treatment for the particular substrate being used. A corrosion-resistant primer may be applied to the edge contact surface 521 that may have been treated. The fan blade edge 520, at the edge contact surface 521, may be coupled to the second adhesive material 515 before the second adhesive material 515 has been cured. In various embodiments, the fan blade edge 520 may be coupled to the second adhesive material 515 in such a way that the second adhesive material 515 may completely or substantially electrically isolate, and/or physically isolate, the first adhesive material 511 from the fan blade edge 520. The composite joint 510 may completely or substantially electrically isolate, and/or physically isolate, the fan blade body 505 from the fan blade edge 520 and form an isolation layer between the two. Thus, the fan blade body 505 and the fan blade edge 520 may not be in contact, or electrochemical communication, which may prevent galvanic corrosion from occurring because they are electrically isolated from each other.

In various embodiments, the different substrates and/or adhesive materials may not be coupled to one another along horizontal surfaces or along surfaces along an axis. A first substrate, such as the fan blade body in 505 in FIG. 5, and the second substrate, such as the fan blade edge 520 in FIG. 5, may be coupled in any way, along any surface, such that the first substrate and the second substrate are separated by a composite joint comprising at least two adhesive materials, the first substrate and the second substrate are not in electrochemical communication, meaning they are electrically isolated from each other, the first substrate is not in contact with, and electrically isolated from, a second adhesive material comprised in the composite joint, and the second substrate is not in contact with, and electrically isolated from, a first adhesive material comprised in the composite joint. The composite joint may serve as an isolation layer to prevent galvanic corrosion from occurring between the first and second substrates.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Methods and systems for the bonding of dissimilar substrates are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A blade of a gas turbine engine, comprising:
    a blade body, comprising an aluminum alloy, having a body contact surface;
    a blade edge, comprising a titanium alloy, having an edge contact surface; and
    a composite joint disposed between the blade body and the blade edge, the composite joint comprising:
        a first adhesive material layer directly coupled to the body contact surface, the first adhesive material layer comprising a first adhesive side; and
        a second adhesive material layer directly coupled to the edge contact surface and the first adhesive side, wherein the second adhesive material layer is in direct contact with the first adhesive material layer, wherein there is a physical boundary between the first adhesive material layer and the second adhesive material layer at the first adhesive side;
    wherein the first adhesive material layer electrically isolates the second adhesive material layer from the blade body, wherein the second adhesive material layer electrically isolates the first adhesive material layer from the blade edge, wherein the composite joint electrically isolates the blade body from the blade edge, and wherein the first adhesive material layer and the second adhesive material layer are unsupported adhesives.

2. The blade of claim 1, wherein the blade body comprises an aluminum alloy comprising, by weight, a minimum of 99.6 percent aluminum, and a maximum of 0.05 percent copper, 0.35 percent iron, 0.03 percent manganese, 0.03 percent magnesium, 0.25 percent silicon, 0.03 percent titanium, 0.05 percent vanadium, 0.05 percent zinc, and the blade edge comprises a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, being the remainder being titanium.

3. The blade of claim 1, wherein the blade body comprises an aluminum alloy comprising, by weight, a maximum of 0.10 percent silicon, 0.15 percent iron, 0.04 percent chromium, 0.05 percent manganese, 0.6 percent titanium, and 2.0-2.6 percent copper, 1.8-2.3 percent magnesium, 7.6-8.4 percent zinc, 0.08-0.25 percent zirconium, with the remainder being aluminum, and the blade edge comprises a titanium alloy comprising, by weight, 5.5-6.75 percent aluminum, 3.5-4.5 percent vanadium, and a maximum of 0.25 percent iron, 0.2 percent oxygen, 0.08 percent carbon, 0.015 percent hydrogen, 0.05 percent nitrogen, with the remainder being titanium.

4. The blade of claim 1, wherein the first adhesive material layer has been cured by vacuum bagging, and wherein the first adhesive side is textured.

5. The blade of claim 1, wherein the first adhesive material layer and the second adhesive material layer comprise the same material.

6. The blade of claim 1, wherein the first adhesive material layer and the second adhesive material layer comprise different materials.

* * * * *